United States Patent [19]

Boudigues

[11] Patent Number: 4,622,816
[45] Date of Patent: Nov. 18, 1986

[54] INTERNAL COMBUSTION ENGINE SUPERCHARGED BY TURBOCOMPRESSOR

[75] Inventor: Serge Boudigues, Sceaux, France

[73] Assignee: Office National d'Etudes et de Recherches Aerospatiales (par abreviation O.N.E.R.A.), France

[21] Appl. No.: 576,317

[22] Filed: Feb. 2, 1984

[30] Foreign Application Priority Data

Feb. 3, 1983 [FR] France .................. 83 01705

[51] Int. Cl.$^4$ .................................................. F02B 37/00
[52] U.S. Cl. ........................................ 60/606; 60/602
[58] Field of Search .................................. 60/606, 602

[56] References Cited

U.S. PATENT DOCUMENTS

| 3,570,240 | 3/1971 | Melchior ................. | 60/606 |
| 4,215,550 | 8/1980 | Dinger ..................... | 60/606 |
| 4,367,626 | 1/1983 | Schwartzman ......... | 60/606 |
| 4,452,043 | 6/1984 | Wallace ................... | 60/606 |

FOREIGN PATENT DOCUMENTS 1012365  4/1952  France ...................... 60/606

Primary Examiner—Douglas Hart
Attorney, Agent, or Firm—Larson & Taylor

[57] ABSTRACT

The turbocompressor for supercharging an internal combustion engine comprises a compressor whose output is connected to the intake manifold of the engine driven by a turbine which is driven by the exhaust gases of the engine. A take-off duct brings a fraction of the airflow supplied by the compressor to the exhaust gases upstream of the turbine. The turbine comprises distributor vanes with variable setting, typically in a range of about 40°. With this arrangement, the low speed running torque and the efficiency are improved, more especially in the case of traction engines.

5 Claims, 6 Drawing Figures

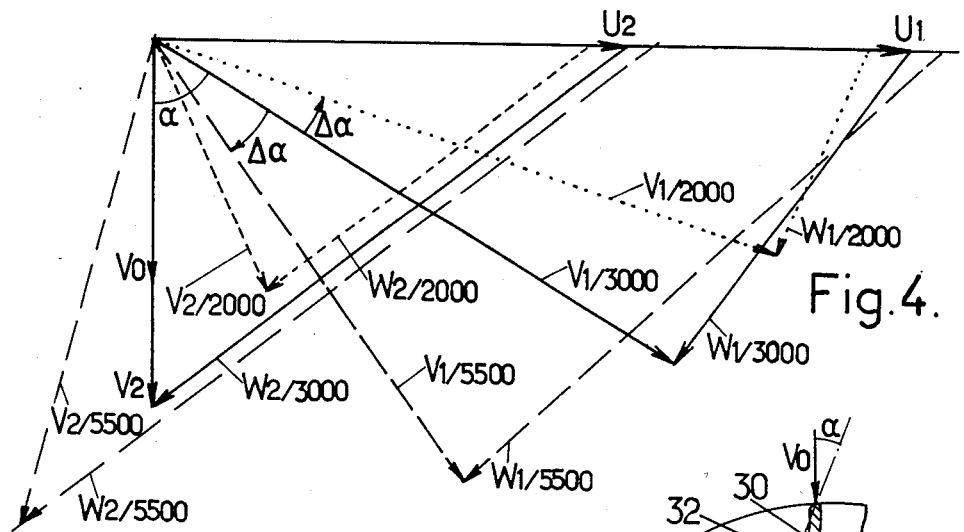
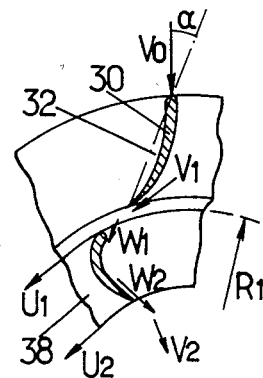
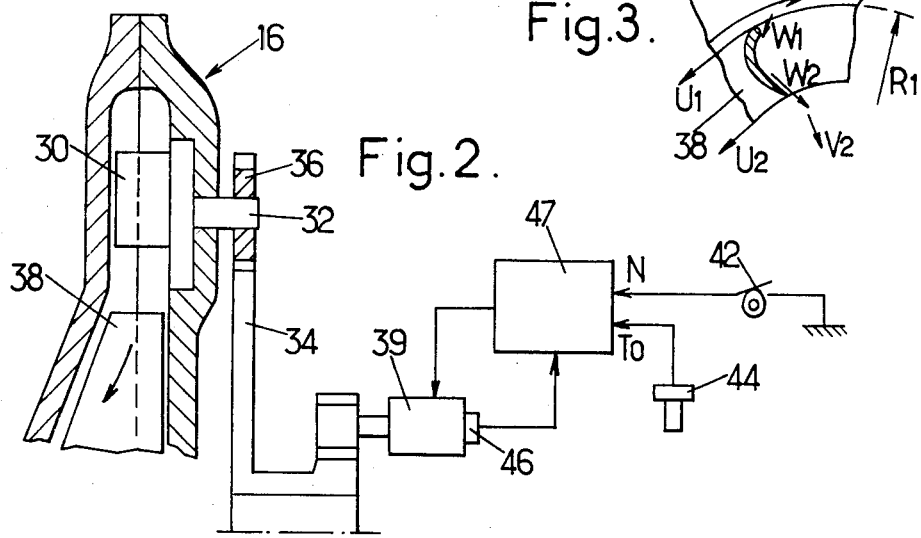
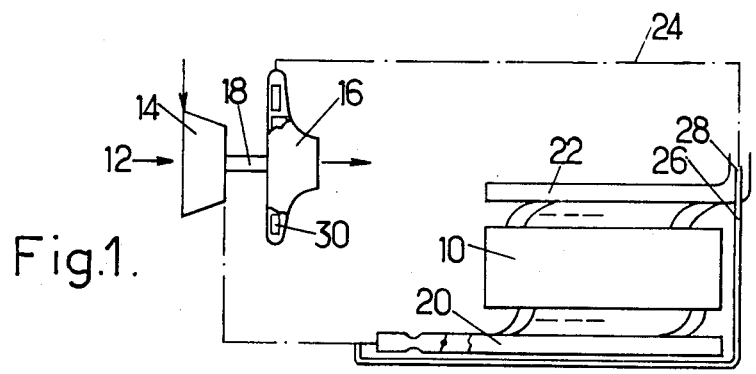

INTERNAL COMBUSTION ENGINE SUPERCHARGED BY TURBOCOMPRESSOR

BACKGROUND AND SUMMARY OF THE INVENTION

The invention relates to internal combustion engine supercharged by at least one turbocompressor comprising at least one compressor whose output is connected to an intake manifold of said engine drivably connected to a turbine which receives the exhaust gases of the engine. The term "internal combustion engine" should be construed as designating any engine whose combustion takes place in a variable volume chamber which may be pressure ignited or spark ignited, reciprocating or rotary.

The invention is suitable for use each time the engine supplies, at its rated operating point, exhaust gases whose energy is sufficient for the compressor to increase the pressure of the air drawn in by the engine. A particularly important, although not exclusive, use is in the field of propulsion engines which must provide a sufficient torque at low running speed and must be capable of providing a very variable power at any rotational speed, (assuming that engine ignition does not require a minimum air intake pressure): this case is that of petrol engines and Diesel engines with a high compression ratio used for propelling motor vehicles.

The problems of matching which arise when associating a turbocompressor, i.e. a continuous flow machine whose delivery pressure is directly related to the airflow which passes through it by a so-called "pressure-flow characteristic field", (which depends solely on the geometry of the compressor and of the turbine) and an engine, a positive displacement machine with discontinuous flow, have been known for a long time and have not up to the present received a fully satisfactory solution. Before describing the invention, it may be useful to recall them while emphasizing those which are particularly acute in the case of propulsion engines and, more especially, motor vehicle engines.

As mentioned above, the relationship between the delivery pressure of the compressor and the airflow which passes therethrough is different from that corresponding to the operation of a reciprocating engine, which absorbs a volume of air flow substantially proportional to its running speed, at a maximum pressure which results from mechanical or physico-chemical considerations. If the turbocompressor is dimensioned so that the supercharging pressure which it supplies never exceeds the maximum acceptable value for the engine, the action of the supercharging turbocompressor is negligible as long as the load on the engine does not approximate its maximum load and the torque of the engine at low speed is very low, substantially equal to that of a non-supercharged engine having the same chamber size. To overcome this problem, additional adjustment of the turbocompressor must be provided. The solution most widely used at the present time consists in using a turbocompressor whose characteristic in the pressure-flow field of the compressor is such that the maximum acceptable supercharging pressure for the engine is reached under partial load and in providing the engine with a "waste gate", which opens the exhaust manifold to the atmosphere. This solution has the advantage of being very simple. But, on the other hand, it presents numerous drawbacks: when the reciprocating engine is running at high speed, it leads to a high value of the exhaust pressure, so to a counter scavenging, to a power drop and to an increase in the consumption of the engine per unit power. Furthermore, it corresponds, under rated operating conditions of the supercharged engine, to operation of the turbocompressor at a point of operation in the pressure-flow field of the compressor at which its efficiency is low.

It has also been proposed to use a turbocompressor whose turbine comprises two cavities (French 2 465 069). This solution provides satisfactory operation at high running speeds. On the other hand, at low running speeds, the second cavity is not fed with exhaust gases. It then operates as a centrifugal compressor of poor efficiency and detrimentally affects the power and the efficiency of the engine in the range in which it is precisely most used, approximately between 20 and 60% of its rated power.

It has also been proposed to provide the input of the turbine with an adjusting valve (FR-A-2 393 999) or to give a variable geometry to the turbine casing (FR-A-2 485 634). But very little influence is exercised on the momentum of the gas flow which defines the pressure-flow rate law of the turbocompressor, so that the improvement obtained is negligible. Moreover, these two solutions involve the presence of moving mechanisms in the very hot exhaust gases, whence a risk of a short useful life.

It is an object of the invention to provide an improved engine supercharged by at least one turbocompressor; it is a more specific object to reduce to a very large extent the above-mentioned disadvantages and, in particular, to maintain a high degree of efficiency of the turbocompressor at all running speeds at which the engine supplies power.

To this end, the invention proposes an internal combustion engine supercharged by at least one turbocompressor comprising at least one compressor whose output is connected to the intake manifold of the engine, driven by a turbine which is driven by the exhaust gases of the engine, characterized in that it comprises a take-off duct bringing a fraction of the airflow delivered by the compressor to the exhaust gases and in that the turbine comprises distributor vanes with variable setting.

The supply of air brought to the exhaust gases reduces temperature of the gases admitted into the turbine and consequently, allows reliable operation of the mechanism for orientating the distributor vanes. The compressor(s) will be generally dimensioned as a function of the engine so that the dilution rate (ratio of the airflow taken off to the airflow passing through the engine) is less than 3. As soon as a value of 1 is reached, the maximum temperature of the exhaust gases is reduced to a value of about 550° C., perfectly compatible with the presence of movable adaptation members. A non return device may be provided in the duct so as to prevent the exhaust gases from returning to the intake.

Under all the conditions in which the engine exerts a driving torque, the pressure at the delivery of the compressor is greater than the pressure at the intake side of the turbine. This fact may be advantageously used by injecting the compressed air coming from the compressor and passing through the off-take duct by means of an ejector which opens into the exhaust pipe of the engine, upstream of the turbine.

The range of movement of the vanes will depend to a large extent on the desired effect. A setting up to about −10° may be envisaged, which allows the engine to be undercharged, and as far as a setting of +70° at tickover. But, in practice, a movement range having an amplitude of 40°, going for example from 20° to 60°, will be perfectly acceptable when the rotational speed of the engine under load varies from 2000 rpm to 5500 rpm. This reduced range of variation of the setting of the vanes is sufficient for the angle of incidence of the gases on the rotor vane grid to vary by only a few degrees and for the angle at the output not to exceed ±10° for constant enthalpy in the compressor and for a constant dilution ratio.

The presence of the by-pass airflow allows favorable results to be obtained which are added to those already mentioned: this take-off flow, since it is continuous, contributes to attenuating the speed and pressure pulsations of the exhaust flow of the engine, and so improves the efficiency of the turbine. The dilution plays a role of silencer which is added to that of the turbine. The reduction of the maximum temperature at the input of the turbine allows the clearances between rotor and stator to be reduced and so the efficiency of the turbine to be further improved. It reduces the angular rotational speed of the turbocompressor by $\sqrt{1+\lambda}$ ($\lambda$ being the dilution ratio) with a favorable effect on the linear speed of the bearings and moreover on the efficiencies by Reynolds effect. Finally, by reducing the counter pressure in the exhaust, a sweep is provided ensuring better filling of the cylinders.

The invention will be better understood from reading the following description of particular embodiments of the invention given by way of non limiting examples.

SHORT DESCRIPTION OF THE DRAWINGS

FIG. 1 is a simplified diagram of a supercharged engine having a take-off duct and a turbocompressor, according to one embodiment of the invention;

FIG. 2 is a detail view showing one possible construction of the mechanism for adjusting the setting of the vanes in the turbine of FIG. 1;

FIG. 3 is a diagram of a detail showing the parameters which come into play for determining the setting, seen along the rotational axis of the turbine, assumed to have a centrifugal or centripetal radial flow;

FIG. 4 shows the determination of the setting to be given to the distributor vanes from speed triangles, the notations being those of FIG. 3;

DETAILED DESCRIPTION OF A PARTICULAR EMBODIMENT

Figure 5A:
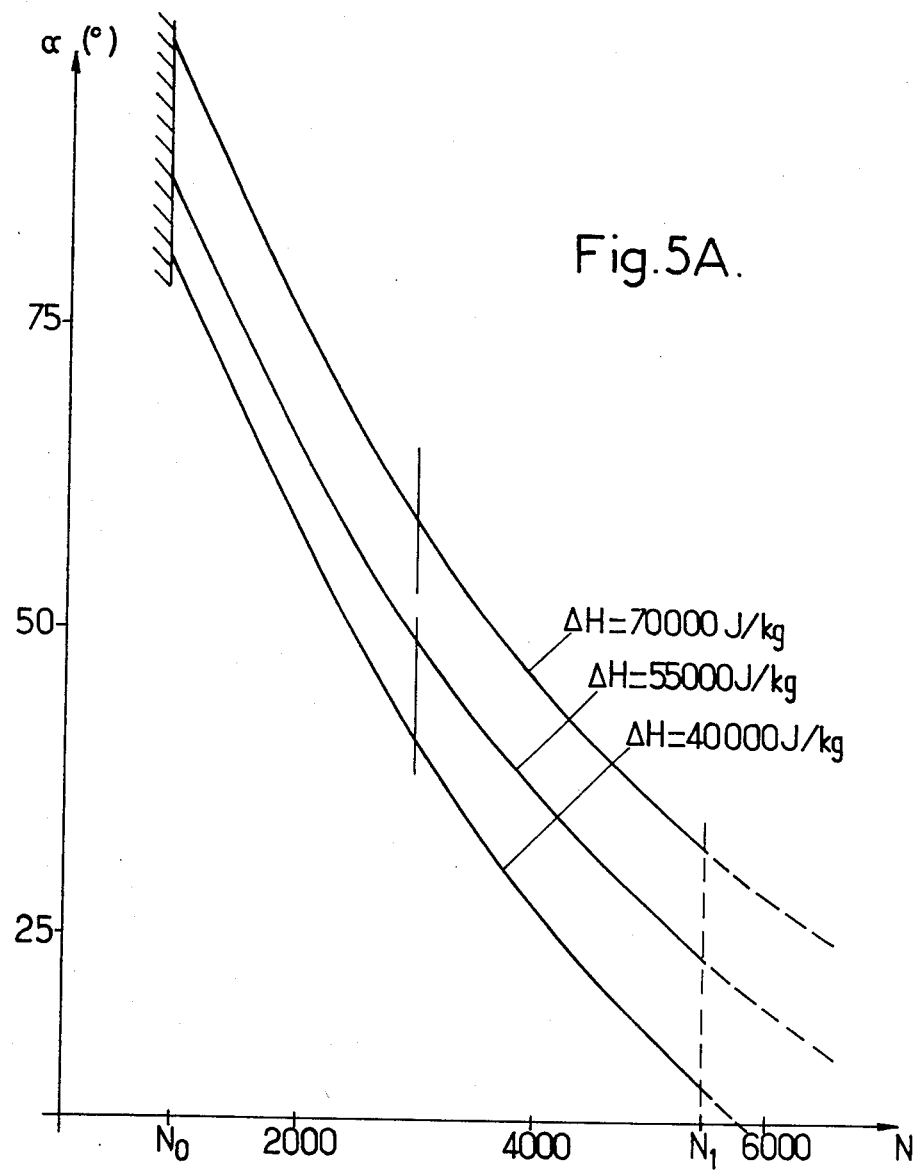
FIGS. 5A and 5B show respectively the optimum setting and the efficiency of the turbine as a function of the speed of the engine, for different enthalpy variations $\Delta H$.

In FIG. 1, the engine 10 which will be assumed to be an internal combustion engine with controlled ignition, for example by means of an electric spark, is associated with a turbocompressor 12 comprising a compressor 14 and a turbine 16 whose rotors are connected together by a shaft 18. It will be assumed in what follows that compressor 14 is a single stage compressor and that turbine 16 is of the radial flow type, it being of course understood that the invention could be applied just as well to an axial flow turbine. Similarly, the present description relates to an engine comprising a single intake manifold and, consequently, a single turbocompressor, but when several intake manifolds each supplying a group of cylinders are provided, the engine may comprise several turbocompressors in accordance with the invention. An air cooler (not shown) may be inserted between the output of the compressor 14 and the intake manifold 20 of the engine. This latter may be of the type with direct injection into the combustion chambers, with low pressure injection into the intake pipe (multipoint or monopoint) or with a carburetor. In this latter case, the carburetor will be placed downstream of the compressor 14.

The exhaust manifold 22 of the engine is connected through a duct 24 to the input of turbine 16. Although the implementation of the invention, which will be described further on, makes the presence of a discharge valve pointless for normal operation of the engine, such a discharge valve may however be provided for safety sake. It is not necessary to describe such a valve here, the construction of which is well known.

A take-off duct 26 must be provided for bringing a fraction of the air from the compressor 14 to the turbine, while mixing it with the exhaust gases upstream of the turbine. In the case shown in FIG. 1, this duct is provided between the intake manifold 20 and the pipe downstream of the exhaust manifold 22. It originates, on the intake side, upstream of the throttle ("butterfly valve") for regulating the power of the engine and upstream of any carburation device. Duct 26 ends in a nozzle 28 forming an injector, so that the fresh air, admitted at a pressure greater than that of the exhaust gases, drives these latter, further promoting sweeping and adding to the amount of movement of the exhaust gases. Duct 26 may be fitted with non return means so as to avoid recycling of the exhaust gases to the intake.

Turbine 16 comprises a stator having a distributor formed of a grid of orientatable vanes 30 (FIGS. 2 and 3). Each vane is mounted, in the case of FIG. 2, on a swivel pin 32 passing through the turbine casing and parallel to the axis of rotation of the rotor. Means are provided for simultaneously controlling all the vanes 30. In FIG. 2 they comprise a toothed crown-wheel 34 which meshes with toothed pinions 36 each fitted on swivel pins 32.

So that the turbine operates with satisfactory efficiency, the absolute value $\vec{V1}$ at the output of the distributor must have an orientation such that the relative speed $\vec{W1}$ with respect to the rotor is substantially tangent to the vanes of the rotor 38. The relative speed $\vec{W2}$ at the output of rotor 38 must, as far as it is concerned, be such that the absolute speed $\vec{V2}$ is substantially radial.

The setting $\alpha$ to be given to vanes 30 for obtaining this result may be determined for each value of the enthalpy variation $\Delta H$ in the turbnine and the speed N of rotation of the engine. It is known that $\Delta H$ is equal to $$\int_{T_0}^{T_2} C_p \cdot T$$

In this formula, $C_p$ is the specific heat at constant pressure of the gas, $T_0$ and $T_2$ are the temperatures upstream and downstream of the turbine.

The setting $\delta$ for each torque of value $\Delta H$ and N is determined by construction of the speed triangles of the speeds W(relative speed), V(absolute speed) and U (tangential speed of the rotor) at the input and the output of the rotor. By way of example, FIG. 4 shows the triangles of the speeds in a situation representative of the operation of a current motor vehicle engine, for ΔH =55,000 joules/kg and N =3000 rpm. The broken line and dotted line vectors show respectively the orientation of $\vec{V_1}$ and so the setting to be provided for the same value of ΔH, but for speeds of 5500 and 2000 rpm.

Figure 5B:
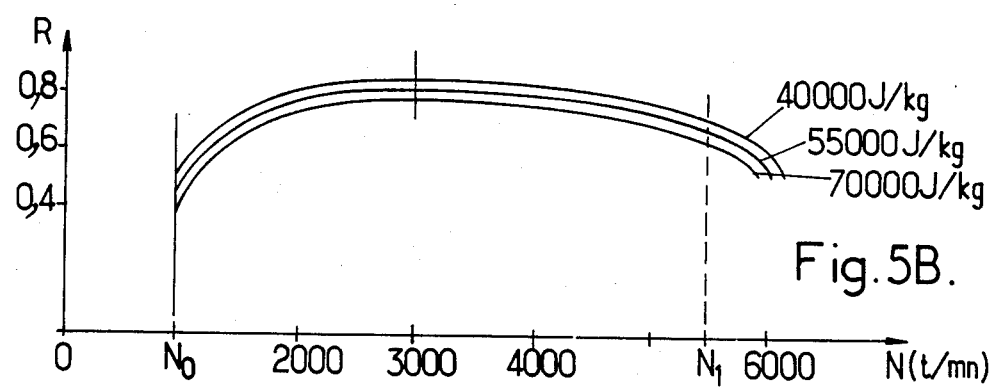

The study of the whole of the operating range of an engine leads to a network of curves of the kind shown in FIG. 5A, giving the optimum setting, for which the turbine efficiency R is that shown in FIG. 5B. The useful part of the curve network is that which goes from slow running speed $N_0$ to the rated speed $N_1$. But in practice it is sufficient to adopt a range of variation of the setting corresponding to the usual speed zone about a value $N_2$, for example from 30° to 70° in the case of FIGS. 5A and 5B.

The setting variation may be achieved automatically by very different means. A control cam system may in particular be used. Fluid pressure servo-motors may also be used. In FIG. 2 an electric control system has been shown schematically. This system comprises a cartographic memory computing circuit 47 receiving input signals and supplying orientation signals to an electric motor 39 controlling the angular movement of the toothed crown wheel 34. The input signals may be provided by a speed sensor 42 (ignition distributor, for example) and by a temperature probe 44 placed in the exhaust pipe, immediately upstream of the turbine. An additional probe may be provided for measuring the temperature downstream of the turbine. Circuit 47 may be digital or analog. In the second case, positional servo-control of motor 38 may be achieved by providing this latter with an angular sensor, for example a potentiometer 46. It is not necessary to describe circuit 47 here, the construction of which may be entirely conventional.

The invention is susceptible of numerous variants, the input parameters may be very different. The position of the butterfly valve for the gases in the case of a motor vehicle engine with controlled ignition may more particularly be used. The mechanical system for driving the vanes may take on very varied forms and comprise for example a driving crown wheel coupled to each vane 30 by a link.

It goes without saying that the scope of the present invention extends to such variants, as well more generally as to all others remaining within the field of equivalences.

What is claimed is:

1. A supercharged internal combustion engine having an intake manifold and an exhaust manifold, comprising:
    a turbocompressor unit with at least one compressor having an outlet connected to said intake manifold and with at least one turbine, said turbine having an inlet connected to receive exhaust gas from said exhaust manifold, distributor blades and a rotor having vanes,
    by-pass pipe means for direct passage of part of the airflow delivered by said compressor to said exhaust gas upstream of said turbine,
    and means for angularly adjusting said distributor blades of said turbine, said adjusting means having motor means for movements of said blades and control means for controlling said motor means responsive to input signals representative of the speed of the engine and the temperature of the exhaust gas immediately upstream of said turbine, said control means being constructed and arranged for setting said blades in an angular position such that the relative speed of the exhaust gas with respect to said rotor is substantially parallel to the inlet chord of the vanes of said rotor.

2. An engine according to claim 1, wherein the range of angular adjustment of said blades is about 40°.

3. An engine according to claim 1, wherein said turbocompressor unit and by-pass pipe means are dimensioned for the ratio between the flow of exhaust gas and the flow of dilution air from said compressor to be higher than 1/3.

4. An engine according to claim 1, wherein said engine has an exhaust pipe and said part of the air flow is delivered into the exhaust gas by ejector means opening into said exhaust pipe.

5. An engine according to claim 1, wherein said control means includes computer means having cartographic storage means for storing a plurality of values of angular positions of said blades each corresponding to a particular pair of values of said speed and of said temperature, first sensor means in contact with the said exhaust gas and connected to deliver a signal to said computer means, and second sensor means arranged to deliver a signal to said computer which is representative of said speed, said computer being adapted to control a motor included in said mechanism.

* * * * *